Dec. 9, 1930.    G. JOHNSON    1,784,630
TOILET SEAT HINGE
Filed Nov. 19, 1928
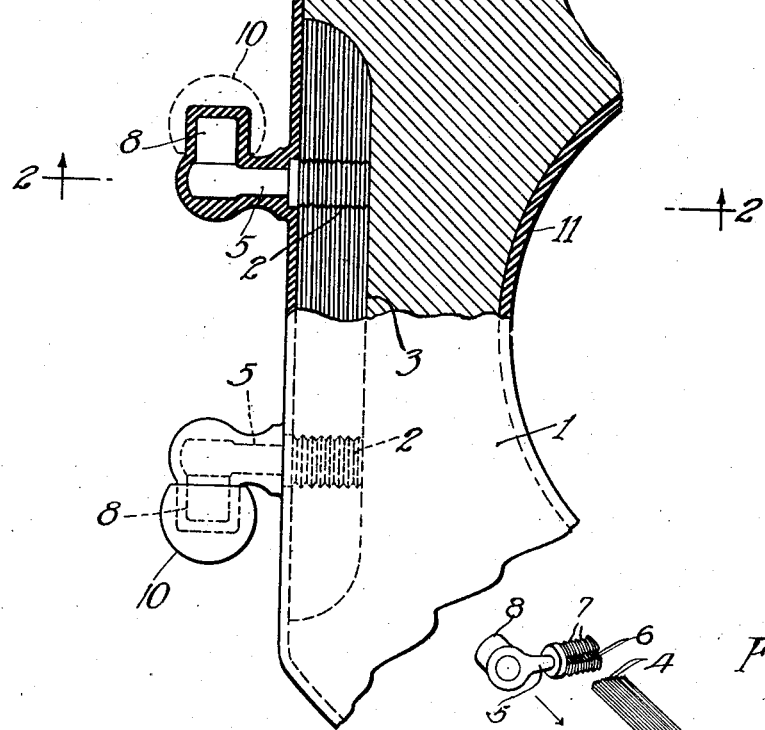
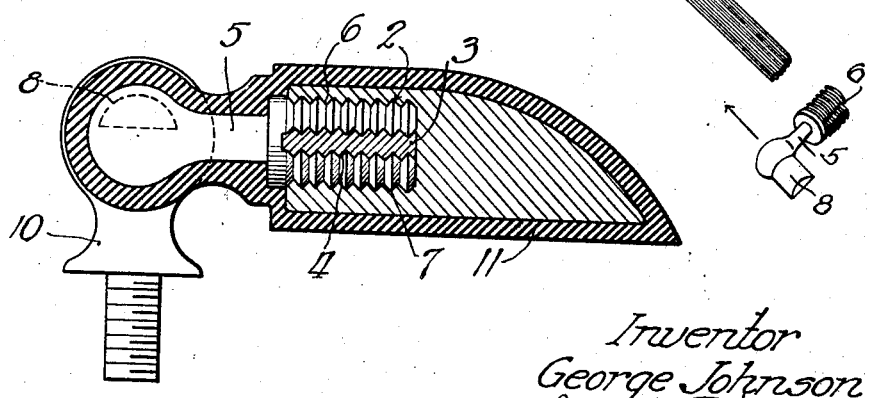
Inventor
George Johnson
by James C. Shea
Atty.

Patented Dec. 9, 1930

1,784,630

UNITED STATES PATENT OFFICE

GEORGE JOHNSON, OF MUSKEGON, MICHIGAN, ASSIGNOR TO THE BRUNSWICK-BALKE-COLLENDER COMPANY, OF CHICAGO, ILLINOIS, A CORPORATION OF DELAWARE

TOILET-SEAT HINGE

Application filed November 19, 1928. Serial No. 320,418.

My invention relates to toilet seats and especially to hinges therefor.

One object of the invention is to provide a toilet seat hinge having a combined insert and hinge lug, in which the lug is adjustable along the insert which is to be embedded in the body of the seat and thus the lug may be located at any desired point so that its position may be made to correspond to the position of a standard for supporting the lug.

Another object of my invention is to provide a hinge of the type described in which two hinge lugs are combined with an insert and are adjustable with respect thereto so that the space between the lugs may be determined and made to correspond to the position of the two standards which support them.

Another object of my invention is to provide a hinge of the type described in which the insert is provided with ribs and is received in slots in the hinge lugs which are also provided with ribs for gripping the insert and interlocking with the ribs thereon, whereby an adjustable relationship between the insert and the hinge lugs is provided, yet a secure connection between them is maintained.

Other objects and advantages will appear as the description proceeds.

Referring to the accompanying drawings:

Fig. 1 is a plan view, partly in section, of a toilet seat embodying my invention;

Fig. 2 is a section on the line 2—2 of Fig. 1, and Fig. 3 is a view showing the insert and hinge lugs separate and illustrating the manner in which these parts are assembled.

A core 1, which may be of wood or of any other desired material, has a recess 2 in the rear thereof which receives an insert 3 extending along the rear of the core.

The insert is provided with ribs 4 and is fitted into a slot in each of the hinge lugs 5. The walls of the slots are also provided with ribs 6, which engage with the ribs 4 on the insert. Ribs 7 are also provided on the exterior surface of that portion of each of the hinge lugs which is received in the recess 2. Each of the lugs projects rearwardly of the core and is provided with a pintle 8 which is pivotally supported by a standard 10.

A coating 11 of plastic material such as hard rubber, bakelite, etc., covers the core 1 and the projecting portion of the hinge lug and completely seals the insert within the core.

In making the described construction, the insert and the hinge lugs are assembled by introducing the ends of the insert into the slots and forcing the lugs along the insert until they reach the desired position. Because of the sliding relationship of the lugs and the insert it is apparent that the lugs may be brought into any desired spaced relation to correspond to the space between the supporting standards.

After the lugs are assembled in the desired position the two parts of each lug between which the insert is located may be pressed firmly against the insert, thus securely locking the parts together.

The insert is then forced into the recess 2 and the coating of plastic composition is applied.

If rubber is used as a coating it is then vulcanized under pressure, and the pressure applied causes the core to securely grip the ribs on the insert and the lugs.

The invention is not limited to the specific details of the constructions illustrated and described. For instance, instead of using the core 1, the entire body of the seat may be molded out of plastic material, in which the insert and hinge lugs may be embedded. Again, it is not essential that the plastic coating extend over the entire hinge lugs, but those portions of the hinge lugs which project beyond the body of the seat may be uncovered.

A substantial range of equivalents is contemplated within the spirit of the invention and the scope of the appended claims.

What I claim as new and desire to protect by Letters Patent is:—

1. The combination of a toilet seat body, an insert embedded in and extending across the rear of said body, a hinge lug having a sliding connection with said insert, said connection permitting lateral movement only of said lug, the material of said body engaging said lug and preventing it from sliding laterally with respect to said insert and means supporting said lug for pivotal movement with said body.

2. In a toilet seat, the combination of a core having a recess therein, an insert fitting in said recess and extending across the rear of said core, a hinge lug extending into said recess and having a sliding connection with said insert, said connection permitting lateral movement only of said lug, the wall of said recess engaging said lug and preventing it from sliding laterally with respect to said insert, a coating of plastic material covering said core and said lug and means supporting said lug for pivotal movement with said core.

3. The combination of a toilet seat body having a recess in the rear thereof, an insert fitting into said recess and extending along the rear of said body and having a guide extending there-along, a hinge lug extending into said recess and engaged in said guide and having such a connection therewith as to permit lateral sliding movement there-along, the wall of said recess engaging said lug and preventing its from sliding laterally with respect to said insert, and the engagement of said lug and said insert preventing rearward movement of said lug and means supporting said lug for pivotal movement with said body.

4. In a toilet seat, the combination of a core having a recess in the rear thereof, an insert fitting in said recess and extending along the rear of said core, a pair of spaced hinge lugs extending into said recess and having a sliding connection with said insert, said connection permitting lateral movement only of the lug, and a coating of plastic material covering said core and said lugs.

5. In a toilet seat, the combination of a core having a recess in the rear thereof, an insert fitting in said recess and extending along the rear of said core, a pair of hinge lugs extending into said recess and secured in interlocked relation to said insert, a coating of hardened plastic material covering said core and said hinge lugs and extending continuously from said core over said lugs, and means supporting said lugs for pivotal movement with said core.

6. In a toilet seat, the combination of a core having a recess in the rear thereof, an insert fitting in said recess and extending along the rear of said core and having ribs thereon engaging the walls of said recess, a pair of hinge lugs each having a slot therein in which said insert is fitted, the walls of the slots having ribs thereon engaging the ribs on the said insert, and a coating of plastic material covering said core and sealing said insert therein.

7. The process of making a toilet seat, which comprises assembling an insert and a hinge lug in interlocked relation whereby they are secured together, forcing the insert and a portion of the lug into the recess in the rear of a toilet seat core, and molding a coating of plastic material about said core and said hinge lug.

8. The process of assembling an insert having longitudinal ribs thereon with a pair of hinge lugs having slots therein and ribs on the walls of the slots comprising placing the insert in said slots with its ribs in interlocked relation with the ribs on the hinge lugs and pressing the hinge lugs, to cause the ribs thereon to securely engage the ribs on said insert.

9. The process of making a toilet seat, which comprises assembling an insert having ribs thereon with a pair of hinge lugs each having slots therein and ribs on the walls of said slots, compressing said hinge lugs to force the ribs thereon to engage the ribs on said insert, forcing said insert into a recess in the rear of a core, and molding a coating of plastic material about said core to enclose said insert therein.

10. In a toilet seat, the combination of a metallic insert member and a pair of hinge lugs secured thereto in spaced relation, each having a slot therein in which the insert is fitted.

11. In a toilet seat, the combination of a metallic insert member and a pair of hinge lugs secured thereto in spaced relation, each having a slot therein in which the insert is fitted, the insert being securely gripped by the sides of the slots and having an interlocked relation therewith.

In testimony whereof I hereunto subscribe my name.

GEORGE JOHNSON.